United States Patent
Soghomonian et al.

(10) Patent No.: US 6,717,323 B1
(45) Date of Patent: Apr. 6, 2004

(54) ROTARY ELECTRIC MOTOR HAVING A PLURALITY OF SKEWED STATOR POLES AND/OR ROTOR POLES

(75) Inventors: Zareh Soghomonian, Sterling, VA (US); Boris A. Maslov, Reston, VA (US); Mark A. Benson, Leesburg, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/160,257

(22) Filed: Jun. 4, 2002

(51) Int. Cl.[7] .............................................. H02K 15/02
(52) U.S. Cl. ................................. 310/254; 310/156.47
(58) Field of Search ................................ 310/254, 218, 310/156

(56) References Cited

U.S. PATENT DOCUMENTS

| | | | |
|---|---|---|---|
| 3,914,859 A | * 10/1975 | Pierson | 29/596 |
| 4,012,651 A | 3/1977 | Burson | 310/153 |
| 4,315,171 A | * 2/1982 | Schaeffer | 310/49 R |
| 4,424,463 A | * 1/1984 | Musil | 310/49 R |
| 4,754,207 A | 6/1988 | Heidelberg et al. | 318/254 |
| 4,786,834 A | 11/1988 | Grant et al. | |
| 4,864,176 A | 9/1989 | Miller et al. | |
| 5,015,903 A | 5/1991 | Hancock et al. | 310/168 |
| 5,030,867 A | 7/1991 | Yamada et al. | 310/156 |
| 5,717,316 A | * 2/1998 | Kawai | 322/46 |
| 5,854,521 A | 12/1998 | Nolle | 310/12 |
| 5,918,360 A | 7/1999 | Forbes et al. | 29/596 |
| 6,181,035 B1 | 1/2001 | Acquaviva | |
| 6,188,159 B1 | 2/2001 | Fan | 310/254 |
| 6,204,587 B1 | * 3/2001 | Torok et al. | 310/181 |
| 6,278,216 B1 | 8/2001 | Li | 310/254 |
| 6,384,496 B1 | 5/2002 | Pyntikov et al. | 310/68 B |

FOREIGN PATENT DOCUMENTS

| | | | |
|---|---|---|---|
| DE | 199 24 038 | 11/2000 | H02K/21/22 |
| EP | 1 052 761 | 11/2000 | H02K/21/14 |
| JP | 2001-119869 | 4/2001 | H02K/1/14 |
| WO | WO 02/19504 | 3/2002 | H02K/21/00 |

OTHER PUBLICATIONS

"Study of Cogging and Torque in Permanent Magnet Machines", C. Studer, A. Keyhani, The Ohio State University, and T. Sebastian, S. Murthy, Saginaw Steering Systems, Delphi, Saginaw, MI, date unknown.

Technical Report, "Study of Cogging Torque in Permanent Magnet Machines", C. Studer and A. Keyhani, The Ohio State University, 1998.

"Shape Optimization for Electromagnetic Devices" date unknown.

XP 002206342 Zhu Z Q et al., "Influence of Design Parameters on Cogging Torque in Permanent Magnet Machines", Dec. 1, 2000, IEEE Transactions on Energy Conversion, IEEE Inc., New York, US, vol. 15, NR 4, pp. 407–412.

\* cited by examiner

*Primary Examiner*—Burton S. Mullins
*Assistant Examiner*—Nguyen N Hanh
(74) *Attorney, Agent, or Firm*—McDermott, Will & Emery (57) ABSTRACT

A rotary electric motor has a stator with a plurality of separate and ferromagnetically isolated electromagnet core segments disposed coaxially about an axis of rotation. Core materials such as a soft magnetically permeable medium that is amenable to formation of a variety of particularized shapes. The core segments are supported by a non-ferromagnetic structure. The rotor comprises a plurality of permanent magnets with surfaces that face an air gap separation from the stator, the surfaces having a common geometric configuration. The stator pole surface geometric configuration and the rotor magnet surface geometric configuration are skewed with respect to each other. The effect of this skewing arrangement is to dampen the rate of change of the magnitude of the cogging torque that is produced by the interaction between a rotor magnet and a pole of a non-energized stator electromagnet as the permanent magnet traverses its rotational path.

10 Claims, 10 Drawing Sheets

ROTARY ELECTRIC MOTOR HAVING A PLURALITY OF SKEWED STATOR POLES AND/OR ROTOR POLES

RELATED APPLICATIONS

This application contains subject matter related to copending U.S. application Ser. No. 09/571,174 of Pyntikov et al., filed May 16, 2000, copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,101 of Maslov et al., filed Oct. 1, 2001, and copending U.S. application Ser. No. 10/067,305 of Maslov et al., filed Feb. 7, 2002, all commonly assigned with the present application. The disclosures of these applications are incorporated by reference herein.

FIELD OF THE INVENTION

The present invention relates to rotary electric motors, more particularly to permanent magnet motors comprising a plurality of rotor and stator poles having surfaces that are geometrically skewed with respect to each other.

BACKGROUND

The above-identified copending related U.S. patent application of Maslov et al., Ser. No. 09/826,423, identifies and address the need for an improved motor amenable to simplified manufacture and capable of efficient S and flexible operating characteristics. In a vehicle drive environment, for example, it is highly desirable to attain smooth operation over a wide speed range, while maintaining a high torque output capability and low ripple at minimum power consumption Such a vehicle motor drive should advantageously provide ready accessibility to the various structural components for replacement of parts at a minimum of inconvenience. The above-identified copending related U.S. applications describe formation of electromagnet core segments as isolated magnetically permeable structures configured in an annular ring. With such arrangements, flux can be concentrated to provide advantageous effects as compared with prior art embodiments.

As described in the above-identified Maslov et al. applications, isolation of the electromagnet core segments permits individual concentration of flux in the magnetic cores, with a minimum of flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group. Further benefits are described from utilization of three dimensional aspects of motor structure, such as a structural configuration wherein axially aligned stator poles and axially aligned rotor magnets provide highly concentrated flux density distribution in the active air gap of the machine. Such configuration provides a greater number of poles with the same individual active air gap surface areas and/or greater total active air gap surface area than conventional motors having the same air gap diameter.

In addition to benefits of flux concentration obtainable with the configurations described above, recently introduced neodymium-iron-boron (NdFeB) magnetic materials can produce larger flux densities than other permanent magnetic materials previously used in brushless machines. The use of high density producing permanent magnets in motors which comprise a great number of poles presents a concern for ameliorating undesired effects that may be introduced by cogging torque. Cogging torque is produced by magnetic attraction between the rotor mounted permanent magnets and those stator poles that are not in a selectively magnetized state. This attraction tends to move the rotor magnet to an equilibrium position in alignment with a stator pole to minimize the reluctance therebetween. As the rotor is driven to rotate by energization of the stator, the magnitude and direction of the cogging torque produced by magnet interaction with non-energized electromagnet segments changes periodically in opposition to the torque produced by the energized stator segments. In the absence of compensation, cogging torque can change direction in an abrupt manner with the rotation of the rotor. If cogging torque is of significant magnitude, it becomes a rotational impediment and source of mechanical vibration that is detrimental to the objectives of precision speed control and smooth operation.

A variety of cogging torque minimization techniques exist in the prior art. Such techniques attempt to reduce the rate of reluctance change with respect to rotor position, reduce the magnetic flux in the machine, or shift poles such that the cogging torque produced by the individual poles cancel one another. Electronic methods can be used to control the intensity of the electromagnetic interaction that takes place between permanent magnet and electromagnet surfaces. Such methods have disadvantages in that they involve complex control algorithms that are implemented simultaneously with motor control algorithms and tend to reduce the overall performance of the motor. Other alternatives would be to reduce the flux density in the magnetic circuit. Reduction of magnetic flux sacrifices advantages obtained from the newer permanent magnet materials and the flux concentration techniques of the above-identified copending applications.

Other approaches involve modifying the construction of the machine by changing the shape of the stator poles. Prior art stator poles conventionally made of stacked laminations are not readily amenable to modification. The machining processes required to effect hat is a limited range of modification of such laminated structures is complex and costly.

The need thus exists for effective cogging compensation in motors having high flux density magnitudes and concentrations that do not detract from the efficient operation and control capability of the motors, while providing practicability of cost and application.

DISCLOSURE OF THE INVENTION

Advantages of the present invention are achieved, at least in part, from the use of core materials such as a soft magnetically permeable medium that is amenable to formation of a variety of particularized shapes. For example, core material may be manufactured from soft magnet grades of Fe, SiFe, SiFeCo, SiFeP powder material, each of which has a unique power loss, permeability and saturation level. Core geometries and core dimensions of stator elements, with relevant tolerances, can be formed without the need to form laminations and thus can be made to optimize the magnetic potential gradient developed between coupled poles of rotor permanent magnets and stator electromagnets. By utilizing the flexibility afforded by the soft iron material to configure a variety of shapes, the magnetic potential gradient can be finely varied so that the changes in cogging torque are less abrupt A smoother operation thus can be obtained without detracting from motor control torque producing capabilities.

An advantage of the present invention is that the relationship between stator poles and rotor poles can be adjusted to control the flux distribution linking the permanent magnet elements with the non-energized electromagnet poles as a function of relative position therebetween. The structural features of one such configuration of the invention are embodied in a motor that comprises a rotor and stator each disposed in an angular ring configuration and spaced from each other by an annular radial air gap. The stator comprises a plurality of separate integral electromagnet core segments disposed coaxially about an axis of rotation. Each core segment comprises two or more poles integrally linked together. A winding is formed on the linking portion to develop, when energized with current, magnetic poles of opposite polarity in adjoining stator poles.

The stator core segments are affixed to a non-ferromagnetic support structure and distributed in the stator ring without ferromagnetic contact with each other. Thus a core segment having a non-energized winding will not have flux produced therein by energization of the winding of another, ferromagnetically isolated, core segment. The non-energized electromagnet core section, however, will be affected by the flux created by movement of a rotor permanent magnet as it approaches and passes the air gap portion facing the stator poles.

In accordance with one aspect of the present invention, the stator poles all have a common surface geometric configuration at the air gap. The rotor comprises a plurality of permanent magnets with surfaces that face the air gap, the surfaces having a common geometric configuration. The stator pole surface geometric configuration and the rotor magnet surface geometric configuration are skewed with respect to each other. Either or both of the stator pole configuration and the rotor magnet configuration may be skewed with respect to the axis of rotation. The effect of this skewing arrangement is to dampen the rate of change of cogging torque that is produced by the interaction between a rotor magnet and a pole of a non-energized stator electromagnet as the permanent magnet traverses its rotational path.

The present invention can apply these advantages to the various structural embodiments disclosed in the above-identified applications. Permanent magnets comprising high flux producing materials are oriented on the rotor surfaces with dipole polar magnetization acing the air gaps. The skewed relationship between the rotor magnet surfaces and the stator pole surfaces may be implemented to alleviate cogging torque manifestations in motors having a single axially aligned row of magnets and stator poles. In motors having a greater number of magnets and stator poles, such as those in which the stator poles of each segment are parallel to the axis of rotation, the skewed relationship effectively compensates for a potentially great cogging torque disturbance. The general structure of the latter motors are exemplified in the copending applications previously identified. Two or more axially spaced rings of separated rotor permanent magnets may be disposed circumferentially along the air gap, the number of rings being equal in number to the number of stator poles in an axially aligned stator core segment. The rows of permanent magnets are spaced axially from each other, each rotor permanent magnet being of opposite magnetic polarity to the magnetic polarity of adjacent permanent magnets in its respective ring and axial row.

Another advantage of the present invention is that the relationship between stator poles and rotor poles can be adjusted to control the flux distributions that produce cogging torque by configuring the stator pole surfaces in a geometric pattern different from the configuration of the permanent magnet surfaces. For example, the rotor magnets may be formed in rectangular surface patterns, while the stator pole surfaces may be formed in any of regular or irregular geometric patterns, the selection of a particular pattern being tailored to the flux distribution desired for a given motor application.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other add different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
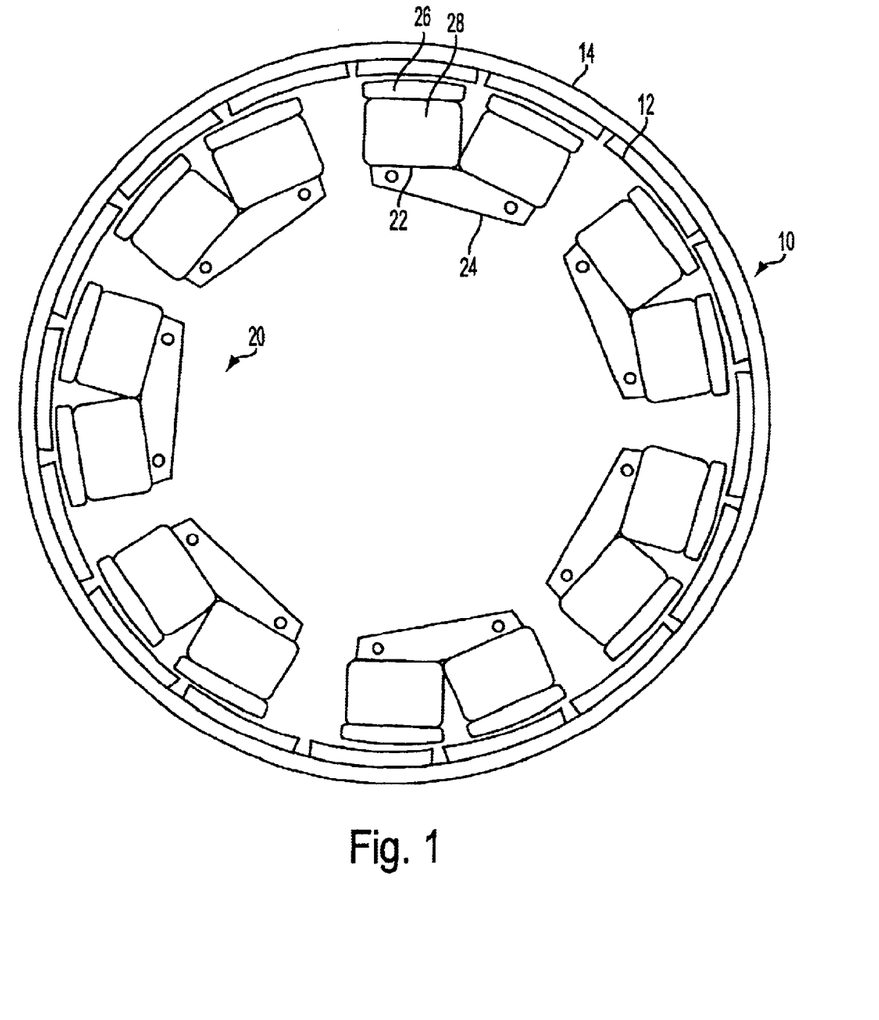
FIG. 1 is an exemplary view showing rotor and stator elements of a motor such as disclosed in the copending application Ser. No. 09/826,422.

FIG. 1 is an exemplary view showing rotor and stator elements of a motor such as disclosed in the copending application Ser. No. 09/826,422, the disclosure of which has been incorporated herein. To clarify illustration, only those elements useful for explanation of the present invention have been shown. Reference is made to the above identified copending applications for more detailed explanation of some of the various exemplified motor embodiments to which the present invention is applicable.

Rotor member 10 is an annular ring structure having permanent magnets 12 substantially evenly distributed along cylindrical back plate 14. The permanent magnets are rotor poles that alternate in magnetic polarity along the inner periphery of the annular ring. The back plate may comprise magnetically permeable material that serves as a magnetic return path between adjacent permanent magnetic poles 12. The rotor surrounds a stator member 20, the rotor and stator members being separated by an annular radial air gap. Stator 20 comprises a plurality of electromagnet core segments of uniform construction that are evenly distributed along the air gap. Each core segment comprises a generally u-shaped magnetic structure 24 that forms two poles having surfaces 26 facing the air gap. The legs of the pole pairs are wound with windings 28. Alternatively, the core segment may constructed to accommodate a single winding formed on a portion linking the pole pair.

Each stator electromagnet core structure is separate, and magnetically isolated, from adjacent stator core elements. The stator elements 24 are secured to a non magnetically permeable support structure, thereby forming an annular ring configuration. This configuration eliminates emanation of stray transformer flux effects from adjacent stator pole groups.

Figure 2:
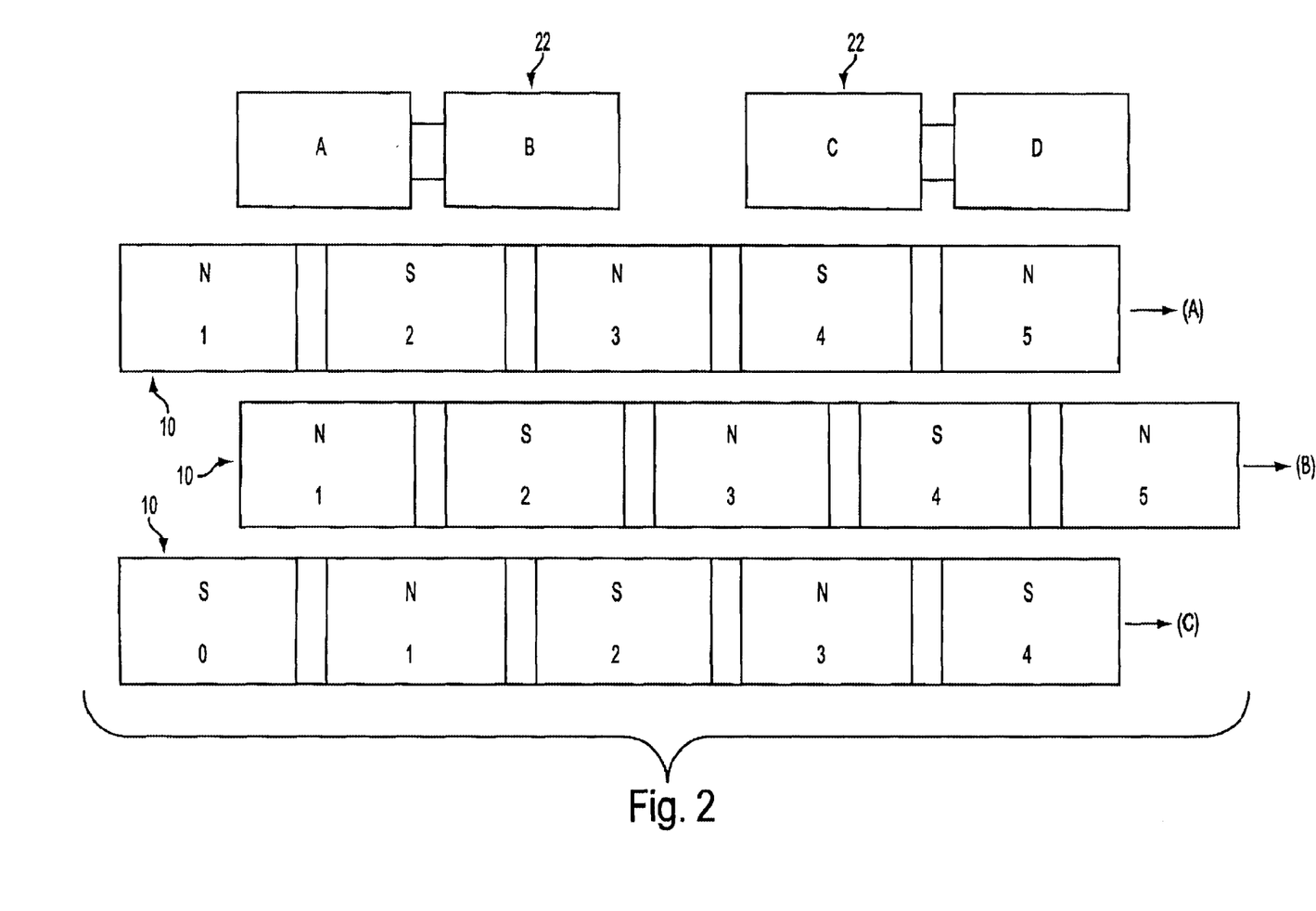
FIG. 2 is a partial plan layout of elements of FIG. 1 illustrating relative positions of stator pole surfaces and rotor surfaces for three instants of time during motor operation

FIG. 2 is a partial plan layout of two adjacent stator core elements 22, with poles denominated A-D, in relation to the rotor magnets, denominated 0–5, during motor operation. The positions of the rotor magnets are depicted at (A)–(C) for three instants of time ($t_1$–$t_3$) during a period in which the rotor has moved from left to right. At time $t_1$, the winding for the A-B stator pole pair is energized with current flowing in a direction to form a strong south pole at A and a strong north pole at B. The winding for the C-D stator pole pair is not energized. The position of the rotor is shown at (A). North magnet 1 and south magnet 2 overlap stator pole A. South magnet 2 and north magnet 3 overlap stator pole D. At this time magnet 3 is approaching an overlapping position with pole C. South magnet 4 is in substantial alignment with pole C and north magnet 5 is in substantial alignment with pole D. At this time motoring torque is produced by the force of attraction between south pole A and north pole magnet 1, the force of attraction between north pole B and south pole magnet 2, and the force of repulsion between north pole B and north pole magnet 3. Poles C and D have respective weak north and south magnetization caused by the attraction of magnets 4 and 5. This attraction, which seeks to maintain minimum reluctance is in opposition to motor driving torque.

At time $t_2$, the rotor has moved to the position shown at (B). The energization of the pole pair A-B windings has been commutated off. Windings of the C-D pole pair are not energized. Magnets 1 and 2 are substantially in alignment with poles A and B respectively. North magnet 3 and south magnet 4 overlap pole C. South magnet 4 and north magnet 5 overlap pole D. Poles A and B have weak south and north magnetization respectively. The stator poles C and D are influenced by both north and south rotor magnets. Pole C is in a flux path between north pole magnet 3 and south pole magnet 4. Pole D is in a flux path between south pole magnet 4 and north magnet pole 5. A cogging torque thus has developed that opposes the motor driving torque and changes in magnitude as the rotor magnets move from direct alignment with the non-energized stator poles to partial alignment At time $t_3$, the rotor has moved to the position shown at (C). Energization of the A-B pole pair windings has been reversed, causing a strong north pole at pole A and a strong south pole at B. Windings of the C-D pole pair are not energized North net 1 and south magnet 2 overlap stator pole B. South magnet 0 and north magnet 1 overlap stator pole A. At this time south magnet 2 is approaching an overlapping position with pole C. North magnet 3 is in substantial alignment with pole C and south magnet 4 is in substantial alignment with pole D.

As described above, the opposing cogging torque effects motoring torque in a manner that varies with respect to relative angular position as the rotation proceeds. The cogging torque is most pronounced at transitional points when a rotor magnet is about to face a stator pole across the air gap. An abrupt change in the cogging torque takes place as the leading edge of the generally rectangular surface of a permanent magnet approaches the parallel edge of the rectangular stator pole. Use of strong permanent magnet materials such as neodymium-iron-boron (NdFeB) magnetic materials, which impart large flux densities at the air gap in the vicinities of the rotor permanent magnets, heightens this undesirable effect to a substantial extent.

Figure 3:
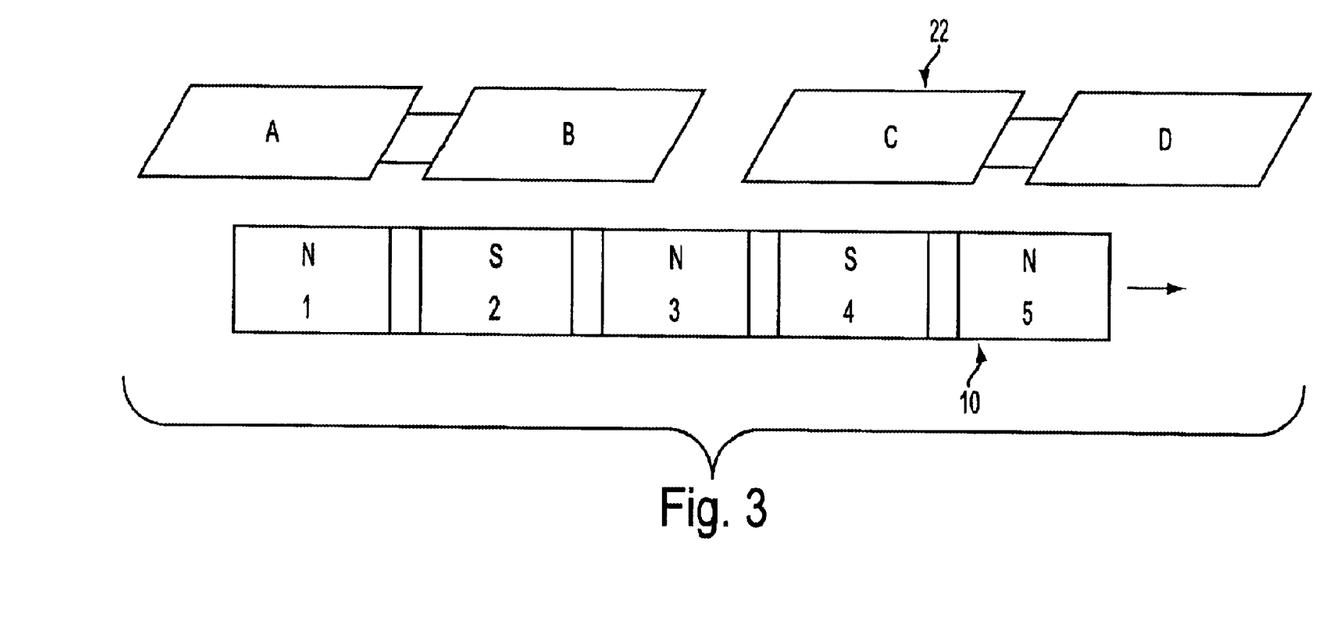
FIG. 3 is a partial plan layout of relative positions of stator pole surfaces and rotor surfaces in accordance with the present invention.

FIG. 3 is a partial plan layout of relative positions of stator pole surfaces and rotor surfaces in accordance with the present invention. The embodiment of FIG. 3 differs structurally from the motor of FIG. 2 in the configuration of the surfaces of the stator poles. The rotor magnet surfaces have a common rectangular configuration. The stator pole surfaces have a common geometric configuration which is skewed with respect to the rectangular orientation of the rotor magnet surfaces. That is, the rectangular surfaces of the stator poles have been changed to non-rectangular parallelograms so that their edges are no longer parallel with the axis of rotation or with edges of the rotor magnet rectangular surfaces. The leading edge of a magnet and the flux imparted therefrom, for example north pole 3, must travel a finite distance between its first intersection with the lower edge (as shown in the drawing) of pole D and the upper edge of pole D. Thus, the change in cogging torque at the transitional points when a rotor magnet approaches overlapping relationship with a stator pole across the air gap is more gradual than the torque change in the embodiment of FIG. 2. It is to be understood that the particular illustration is by way of example, as the degree and direction of skew may be changed to alter the effects as desired.

Figure 4:
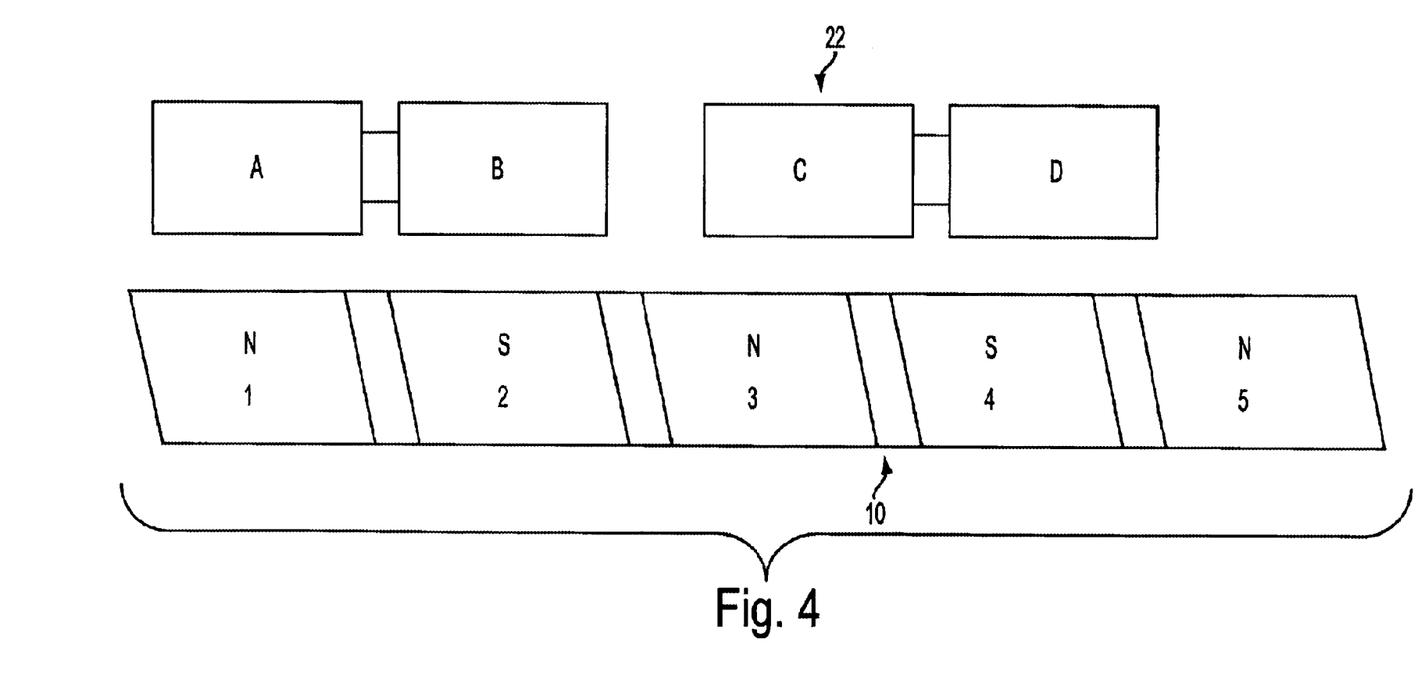
FIG. 4 is a partial plan layout of relative positions of stator pole surfaces and rotor surfaces in accordance with another embodiment of the present invention.

FIG. 4 is a partial plan layout of relative positions of stator pole surfaces and rotor surfaces in accordance with another embodiment of the present invention. The embodiment of FIG. 4 differs structurally from the motor of FIG. 2 in the configuration of the surfaces of the rotor magnets. The stator pole surfaces have a common rectangular configuration. The rotor magnet surfaces have a common geometric configuration which is skewed with respect to the rectangular orientation of the stator pole surfaces. The surfaces of the rotor magnets are non-rectangular parallelograms with edges that are no longer parallel with the axis of rotation or the edges of the stator pole rectangular surfaces. The leading edge of a magnet and the flux imparted therefrom, for example north pole 3, must travel a finite distance between its first intersection with the lower edge (as shown in the drawing) of pole D and the upper edge of pole D. Thus, the change in cogging torque at the transitional points when a rotor magnet approaches overlapping relationship with a stator pole across the air gap is more gradual than the torque change in the embodiment of FIG. 2. The degree and direction of skew may be changed to alter the effects as desired.

Figure 5:
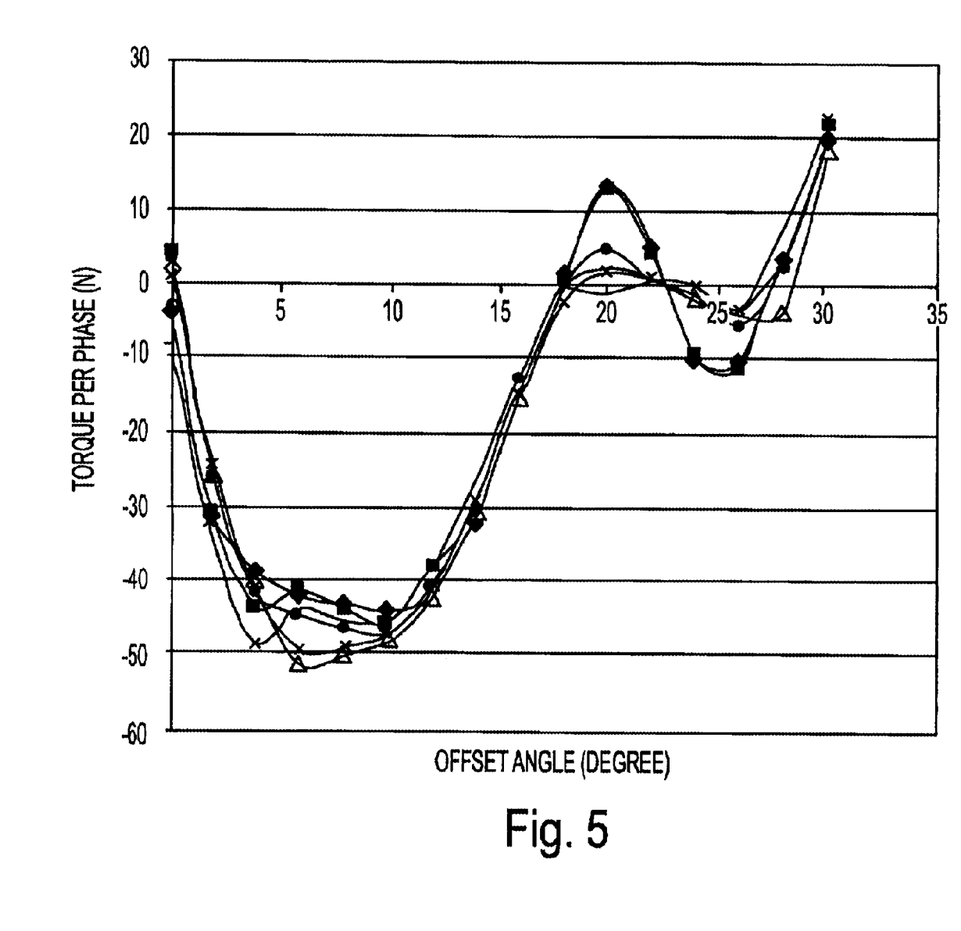
FIG. 5 is a plot of torque per phase versus angle for various structural configurations.

FIG. 5 is a plot of torque per phase versus angle for various structural configurations. The effects of cogging torque on the motoring torque is most pronounced in the range between eighteen and twenty eight degrees in these specific examples. By adjusting the degree of skew, the large torque oscillation in that range can be smoothed to acceptable levels. In the embodiments of FIGS. 3 and 4, the stator pole surface configuration and the rotor magnet surface configuration are skewed with respect to each other. In each illustration, either the rotor magnet surface configuration (FIG. 3) or the stator pole surface configuration (FIG. 4) is not skewed with respect to the axis of rotation. However, it is within the concept of the invention that both rotor magnet surface configuration and stator pole surface configuration may be skewed with respect to the rotation axis, so long as they are also skewed with respect to each other.

Figure 6:
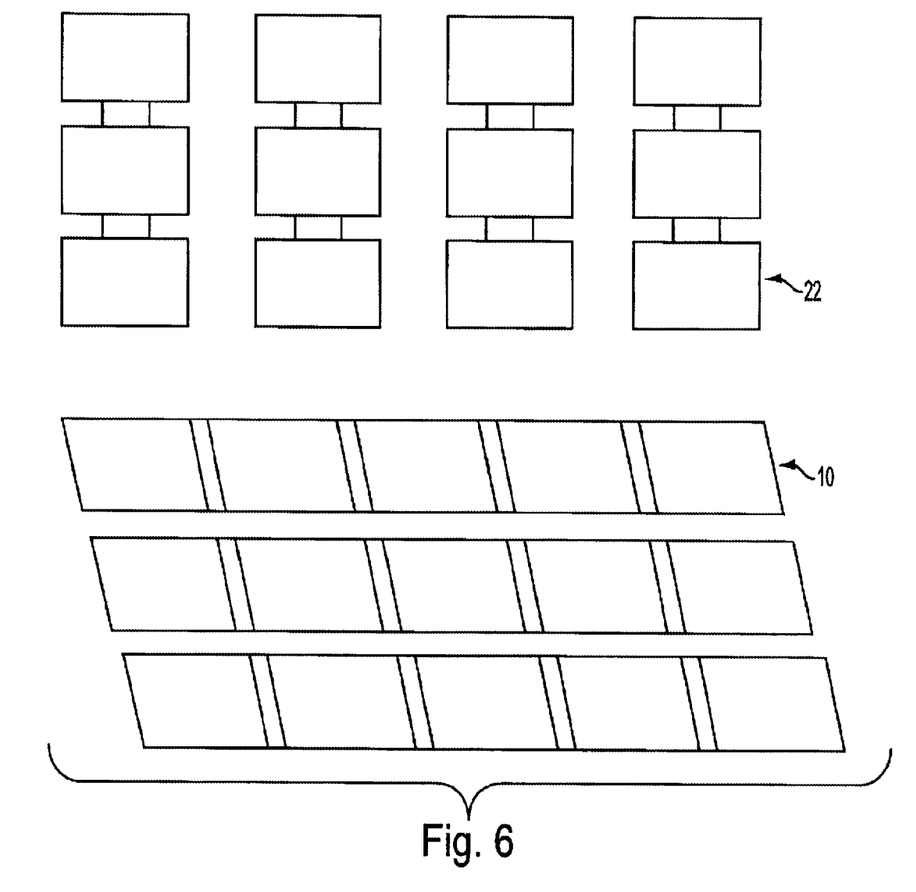
FIG. 6 is a partial plan layout of relative positions of stator pole surfaces and rotor surfaces in accordance with another embodiment of the present invention

FIG. 6 is a partial plan layout of relative positions of stator pole surfaces and rotor surfaces in accordance with another embodiment of the present invention. Stator 22 comprises a plurality of separate integral electromagnet core segments having multiple poles in axial alignment. The rotor 10 comprises a plurality of axial rows of dipole magnets circumferentially distributed about the air gap and surrounding the stator. While three sets of stator segment poles and magnet rows are shown for purposes of illustration, it is to be understood that a different number of stator segment poles and rotor magnet rows are within the concept of the present invention.

The stator pole surfaces have a common rectangular configuration. In like manner to the embodiment of FIG. 4, the rotor magnet surfaces have a common geometric configuration which is skewed with respect to the rectangular orientation of the stator pole surfaces. The surfaces of the rotor magnets form non-rectangular parallelograms with edges at the circumferences that are not parallel with the axis of rotation or with the edges of the stator pole rectangular surfaces. The leading edge of a magnet and the flux imparted therefrom must travel a finite distance between its first intersection with the lower edge (as shown in the drawing) and upper edge of a stator pole with which it is axially aligned. As in the embodiment of FIG. 4, the change in cogging torque at the transitional points when a rotor magnet approaches overlapping relationship with a stator pole across the air gap is more gradual than torque changes that would occur with rectangular surfaces at both the stator and rotor. The smoothing of cogging torque perturbations is particularly beneficial with the great number of transitions that occur with a plurality of poles and magnets.

Figure 7:
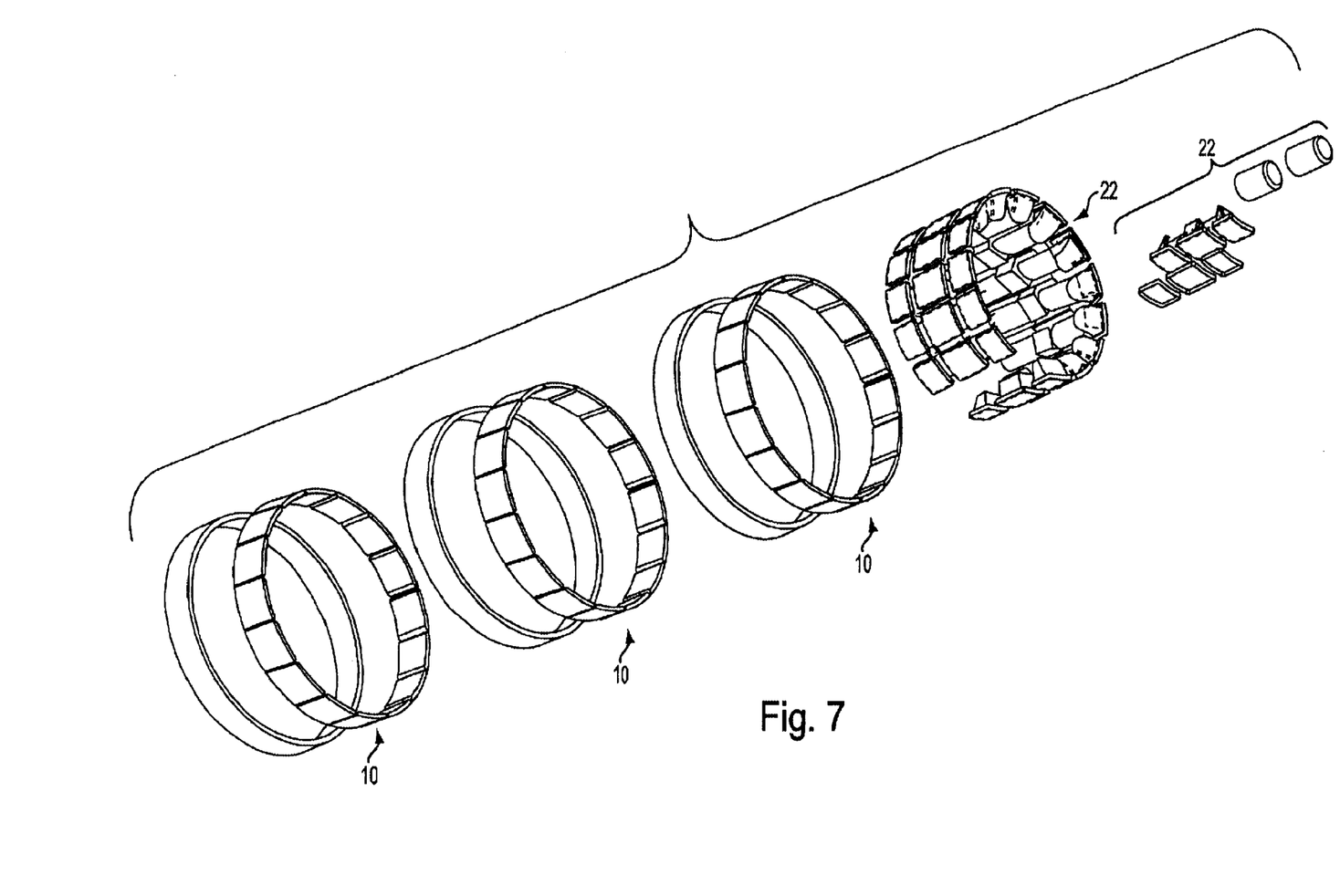
FIG. 7 is a three-dimensional exploded structural view of the elements of FIG. 6.

FIG. 7 is a three-dimensional exploded structural view of the elements of FIG. 6. The plurality of axially spaced rows 10 of rotor dipole magnets are circumferentially distributed about a cylindrical air gap and surround the stator core segments 22. The rotor magnets alternate in magnetic polarity circumferentially along the air gap. In each axially aligned row of rotor magnets, the center magnet exhibits a magnetic polarity at the air gap surface that is opposite to the magnetic polarity of lateral magnets. The stator comprises a plurality of separated integral electromagnet core segments having multiple poles in axial alignment. Windings may be formed on the poles or on the core portions that link the poles. Reference is made to copending application (Attorney Docket No. 57357-019) for detailed discussion of applicable supporting structure for these rotor and stator elements, including non-ferromagnetic supporting structure for the stator core elements.

Figure 8:
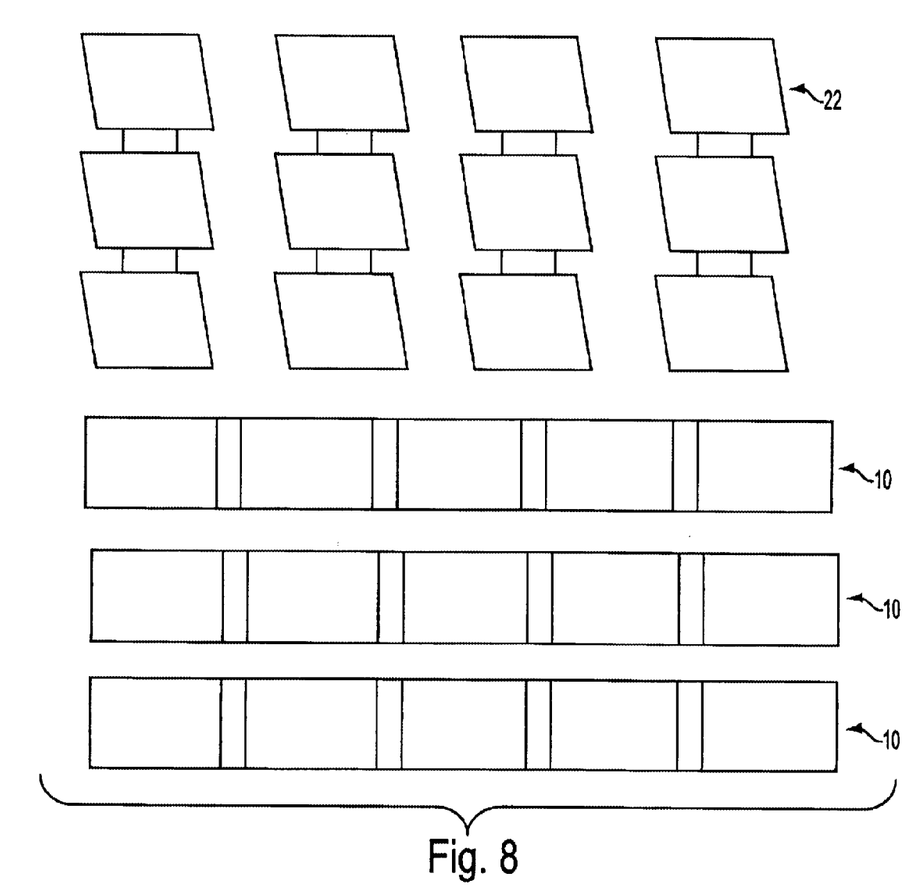
FIG. 8 is a partial plan layout of relative positions of stator pole surfaces and rotor surfaces in accordance with another embodiment of the present invention.

FIG. 8 is a partial plan layout of relative positions of stator pole surfaces and rotor surfaces in accordance with another embodiment of the present invention. In a layout similar to the layout of FIG. 6, stator 22 comprises a plurality of separate integral electromagnet core segments having multiple poles in axial alignment. The rotor 10 comprises a plurality of axial rows of dipole magnets circumferentially distributed about the air gap and surrounding the stator. While three sets of stator segment poles and magnet rows are shown for purposes of illustration, it is to be understood that a different number of stator segment poles and rotor magnet rows are within the concept of the present invention.

The rotor magnet surfaces have a common rectangular configuration. In like manner to the embodiment of FIG. 3, the stator pole surfaces have a common geometric configuration which is skewed with respect to the rectangular orientation of the rotor magnet surfaces. The surfaces of the stator poles form non-rectangular parallelograms with edges at the circumferences that are not parallel with the axis of rotation or with the edges of the rotor magnet rectangular surfaces. The leading edge of a magnet and the flux imparted therefrom must travel a finite distance between its first intersection with the upper edge (as shown in the drawing) and lower edge of a stator pole with which it is axially aligned. The change in cogging torque at the transitional points when a rotor magnet approaches overlapping relationship with a stator pole across the air gap is more gradual than torque changes that would occur with rectangular surfaces at both the stator and rotor.

Figure 9:
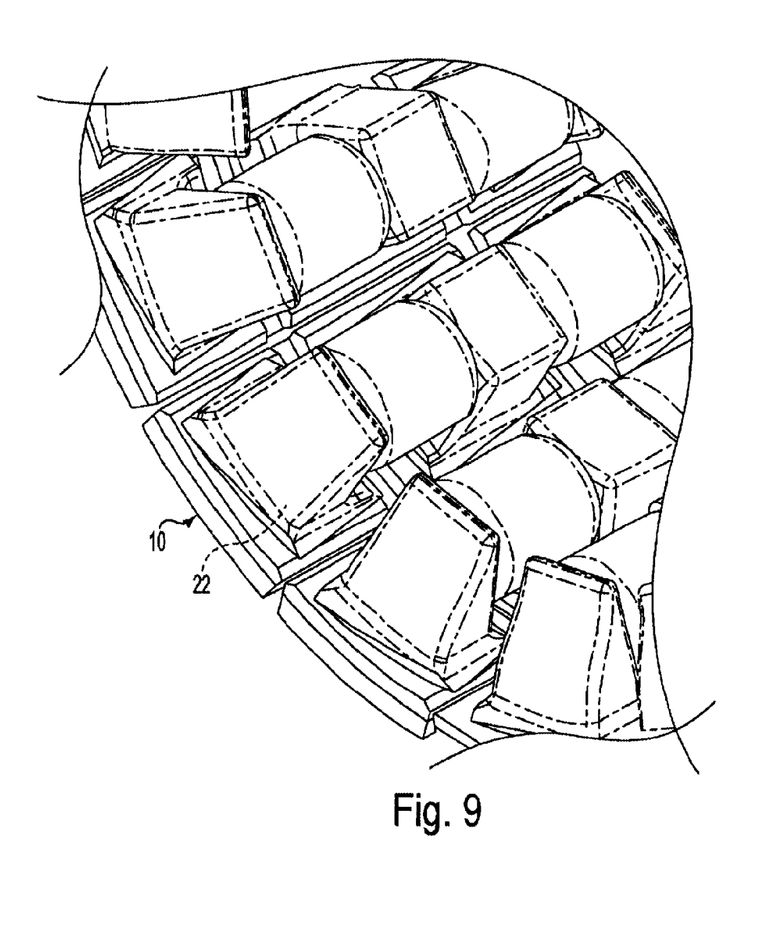
FIG. 9 is a partial three-dimensional view of the rotor and stator structure for the embodiment of FIG. 8.
Figure 10A:
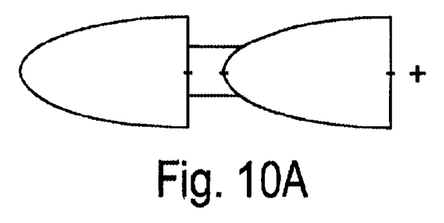
FIGS. 10(A)–10(F) illustrate various alternative stator core element pole pairs, having different geometric surface pattern configurations in lieu of the skewed stator pole configurations of FIGS. 3 and 8.
Figure 10B:
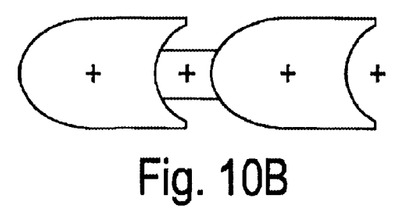
Figure 10C:
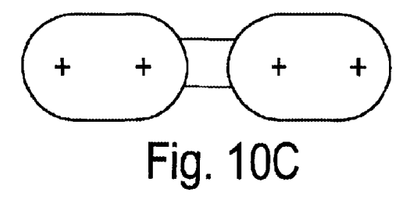
Figure 10D:
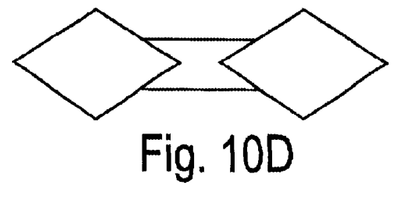
Figure 10E:
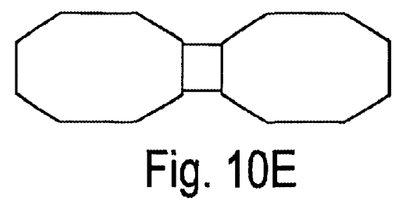
Figure 10F:
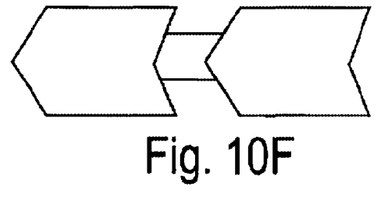

FIG. 9 is a partial three-dimensional view of the rotor and stator structure for the embodiment of FIG. 8. As can be seen from the figure, rotor magnet rows 10 and stator core segments 22 are aligned parallel to the axis of rotation. The stator pole faces, however, are skewed with respect to the axis.

FIGS. 10(A)–10(F) illustrate various alternative stator core element pole pairs, having different geometric surface pattern configurations in lieu of the skewed stator pole configurations of FIGS. 3 and 8. Each pole pair is part of a ferromagnetically isolated core as in the other figures and may be aligned in a direction parallel to the axis of rotation, as in FIGS. 6–9, or perpendicular to the axis of rotation, as in FIGS. 1–4. The rotor magnets preferably are of rectangular surface configuration. As the rotor travels from left to right, the leading edges of the magnets and the flux imparted therefrom variably overlap the stator poles to smooth the cogging torque effects. The geometric patterns shown can be tailored to provide desired effects depending on application.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the configurations shown in FIGS. (10A)–10(F) may be formed as rotor magnets while the stator pole flees have rectangular or different surface geometric configurations.

While specific geometric configurations of the stator core elements have been illustrated, it should be recognized that the inventive concept herein encompasses a multitude of variations of these configurations as virtually any shape can be formed using the powder metal technology. Thus a specific co configuration can be tailored to the flux distribution desired.

Although the description of the present invention depicts the stator surrounded by the rotor, the concepts of the invention are equally applicable to motors in which the rotors are surrounded by stators.

What is claimed is:

1. A rotary electric motor comprising:
a stator comprising a plurality of separated, ferromagnetically isolated, electromagnet core segments disposed coaxially about an axis of rotation to form an annular cylindrical stator ring, each of the core rents comprising a plurality of poles that are axially aligned with each other; and
a cylindrical annular rotor concentric with the stator and spaced therefrom by a cylindrical air gap, said rotor comprising a plurality of permanent magnets having surfaces acing the air gap; wherein
the poles of the stator core segments have a common surface geometric configuration at the air gap;
the permanent magnet surfaces have a common geometric configuration; and
the stator pole surface configuration and the rotor magnet surface configuration are skewed with respect to each other.

2. A rotary electric motor as recited in claim 1, wherein the stator pole configuration is skewed with respect to the axis of rotation.

3. A rotary electric motor as recited in claim 1, wherein the rotor magnet configuration is skewed with respect to the axis of rotation.

4. A rotary electric motor as recited in claim 1, wherein the stator core segments arc affixed to a non-ferromagnetic support structure and distributed in the stator ring without ferromagnetic contact with each other.

5. A rotary electric motor as recited in claim 1, wherein each core segment comprises at least three poles.

6. A rotary electric motor as recited in claim 1, wherein the plurality of rotor permanent magnets form axially spaced rings of separated magnets disposed circumferentially along the air gap, the number of said rings being equal in number to the number of stator poles in a stator core segment; and
corresponding magnets in the rings are aligned axially in rows.

7. A rotary electric motor as recited in claim 6, wherein each rotor permanent magnet is of an opposite magnetic polarity to the magnetic polarity of adjacent permanent magnets in its respective ring and axial row.

8. A rotary electric motor as recited in claim 1, wherein the electromagnet core segments are formed of powdered metal material.

9. A rotary electric motor as recited in claim 1, wherein each permanent magnet is a magnetic dipole having one magnetic polarity at the surface facing the air gap and the opposite magnetic polarity at a surface facing away from the air gap, thereby forming a magnetic polar orientation in a direction perpendicular to the air gap.

10. A rotary electric motor comprising:
a stator comprising a plurality of separated, ferromagnetically isolated, electromagnet core segments disposed coaxially about an axis of rotation to form an annular cylindrical stator ring, each of the core segments comprising poles integrally formed with a linking portion joining adjacent poles, and coils wound on the core segment thereby forming a winding to develop, when energized with current, magnetic poles of opposite polarity in adjoining stator poles; and
a cylindrical annular rotor concentric with the stator and spaced therefrom by a cylindrical air gap, said rotor comprising a plurality of permanent magnets having surfaces facing the air gap; wherein
the poles of the stator core segments have a common surface geometric configuration at the air gap;
the permanent magnet surfaces have a common geometric configuration; and
the stator pole surface configuration and the rotor magnet surface configuration are skewed with respect to each other;
wherein each stator core segment comprises only a single pair of poles.

\* \* \* \* \*